US008797404B2

(12) United States Patent
Joseph et al.

(10) Patent No.: US 8,797,404 B2
(45) Date of Patent: Aug. 5, 2014

(54) MANAGING MEMORY IN A SURVEILLANCE SYSTEM

(75) Inventors: Chermarajan Joseph, Sivakasi (IN); Muralitharan Perumal, Trichy (IN)

(73) Assignee: Honeywell International Inc., Morristown, NJ (US)

( * ) Notice: Subject to any disclaimer, the term of this patent is extended or adjusted under 35 U.S.C. 154(b) by 1259 days.

(21) Appl. No.: 12/172,348

(22) Filed: Jul. 14, 2008

(65) Prior Publication Data

US 2010/0007731 A1 Jan. 14, 2010

(51) Int. Cl.
*H04N 7/18* (2006.01)

(52) U.S. Cl.
USPC ............ 348/143; 348/148; 348/150; 348/159

(58) Field of Classification Search
CPC ..................... G08B 13/19667; G08B 13/1968; G08B 13/19671; H04N 7/18
USPC .................................. 348/143–148, 150–159
See application file for complete search history.

(56) References Cited

U.S. PATENT DOCUMENTS 6,041,361 A * 3/2000 Wilson et al. ................. 709/253
6,069,655 A * 5/2000 Seeley et al. .................. 348/154
6,144,797 A * 11/2000 MacCormack et al. ...... 386/224
6,618,074 B1 * 9/2003 Seeley et al. .................. 348/143
7,746,378 B2 * 6/2010 Shu et al. ...................... 348/143
7,760,230 B2 * 7/2010 Russell et al. ................ 348/143
8,624,975 B2 * 1/2014 Groenenboom .............. 348/143
2003/0086000 A1 * 5/2003 Siemens et al. ............... 348/148
2003/0185296 A1 * 10/2003 Masten, Jr. ............... 375/240.01
2004/0119820 A1 * 6/2004 Nagao et al. .................. 348/143
2004/0143602 A1 * 7/2004 Ruiz et al. .................. 707/104.1
2004/0155958 A1 * 8/2004 Lee .............................. 348/143
2005/0102704 A1 * 5/2005 Prokupets et al. ............ 725/118
2005/0162515 A1 * 7/2005 Venetianer et al. ........... 348/143
2005/0271251 A1 * 12/2005 Russell et al. ................ 382/103
2006/0001742 A1 * 1/2006 Park ............................. 348/143
2006/0066720 A1 * 3/2006 Renkis .......................... 348/143
2006/0078047 A1 * 4/2006 Shu et al. ................. 375/240.01
2006/0089895 A1 * 4/2006 Joye et al. ........................ 705/35
2006/0176369 A1 * 8/2006 Meritt ........................... 348/143
2006/0184553 A1 * 8/2006 Liu et al. ....................... 707/101
2006/0192675 A1 * 8/2006 Renkis .......................... 340/540
2006/0274828 A1 * 12/2006 Siemens et al. .......... 375/240.01
2006/0274829 A1 * 12/2006 Siemens et al. .......... 375/240.01
2007/0166001 A1 * 7/2007 Barton et al. ................... 386/68
2007/0217501 A1 * 9/2007 Siemens et al. .......... 375/240.01
2007/0296817 A1 * 12/2007 Ebrahimi et al. ............. 348/161
2008/0136910 A1 * 6/2008 Berkey et al. ................. 348/143
2009/0079823 A1 * 3/2009 Bellamy et al. ............... 348/143
2009/0135007 A1 * 5/2009 Donovan et al. .............. 340/540
2009/0193055 A1 * 7/2009 Kuberka et al. ............ 707/104.1
2009/0322881 A1 * 12/2009 Shu et al. ...................... 348/148

* cited by examiner

*Primary Examiner* — Wing F Chan
*Assistant Examiner* — Razu Miah
(74) *Attorney, Agent, or Firm* — Husch Blackwell LLP

(57) ABSTRACT

Systems and methods to manage memory in a surveillance system are disclosed. The present invention discloses a rule-based storage clearance system or storage archive. A storage server has a user interface, a logic unit, and a storage device. A plurality of video footage files is continuously being streamed to the storage server and recorded on the storage device. The objective is to help erase or archive stored video footage based on static and dynamic surveillance parameters or rules. The rules can be applied either stream-wise or time-wise. The rule checks for clearing or archiving the storage by tallying various parameters such as: events associated with each stream, user bookmarks, the priority of individual streams, and the age of each stream, etc.

16 Claims, 3 Drawing Sheets

MANAGING MEMORY IN A SURVEILLANCE SYSTEM

FIELD OF THE INVENTION

The present invention relates generally to video surveillance systems. Specifically, the present invention relates to managing memory and storage space dynamically in a digital video surveillance system.

BACKGROUND OF THE INVENTION

Currently, video surveillance storage devices require large amounts of media storage. Many hours of footage from a plurality of sources need to be stored for a certain amount of time before they are reviewed. For instance, a plurality of digital Closed-Circuit Television (CCTV) cameras may monitor different areas of a secure building such as a museum. The footage from each camera may be stored locally, or submitted to a control panel or further forwarded to a central monitoring station, at which point the video data will be stored on a database until it needs to be reviewed, or until it is expired.

Video data is stored for a number of reasons. If an incident, such as a theft, is detected, it is imperative to review at least the past couple of days of footage to detect patterns in the behavior of potential perpetrators. On the other hand, the reviewing of a certain video stream may be handed across multiple levels, where a junior officer reviews the video first, and then a more senior officer may review the footage. Since the process may take some time, the footage needs to be stored and accessible at any time (i.e., not archived).

Video data may also be erased for numerous reasons, the foremost of which is storage space. Digital video data is by no means compact. Even most compressed file formats occupy up to four times as much space as compressed audio, or 3-4 megabytes per minute. This number could go lower if video quality is sacrificed but a certain resolution needs to be maintained for effective security monitoring purposes. Since a couple of days of video and audio will require 3-4 gigabytes of storage space, one can predict how much of a burden on a storage unit it would be to have multiple cameras from different sources recording video that needs to be immediately accessible over a few days. Additionally, video data may also be erased for privacy concerns, depending on the footage and the age of the footage.

To prevent waste of valuable storage space and memory, storage devices may be programmed to "recycle" space automatically, at specified intervals, or based on certain factors. A logic unit on a storage server may be programmed to erase footage that is more than a week old. Alternatively, footage from different sources is prioritized differently, so low-priority footage is deleted to make room for higher-priority footage. The problem with this is that the "automation" is based on static pre-defined factors. Further, there is limited flexibility in defining these factors to determine optimal memory management. For instance, there is no ability to define recycling based user-selected events, user-bookmarked recordings for non-deletion, and user bookmarked recordings for deletion.

What is needed is the ability to efficiently and dynamically manage storage and memory in a surveillance system, thus ensuring maximum storage availability.

BRIEF SUMMARY OF THE INVENTION

The present invention proposes a rule-based storage clearance system or storage archive. A storage server has a user interface, a logic unit, and a storage device. A plurality of video footage files is continuously being streamed to the storage server and recorded on the storage device. The objective is to help erase or archive stored video footage based on static and dynamic surveillance parameters or rules. The rules can be applied either stream-wise or time-wise. The rule checks for clearing or archiving the storage by tallying various parameters such as: events associated with each stream, user bookmarks, the priority of individual streams, and the age of each stream, etc.

According to one exemplary embodiment, the present invention is a surveillance system with dynamic memory management, comprising a video camera for recording a video clip, a logic unit for assigning a priority to the video clip based on a plurality of adjustable surveillance parameters, and a storage unit for storing the video clip for a time proportional to the priority of the video clip. The video cameras, logic unit, and storage unit are all in communication over a wired or wireless packet-based network. The plurality of adjustable surveillance parameters further comprises any combination of source parameters, media parameters, user parameters, and correlation parameters. The source parameters adjust priority of the video clip based on characteristics of the video camera that recorded the video clip, media parameters adjust priority of the video clip based on the content of the video clip, and user parameters adjust priority of the video clip based on user-defined rules. The surveillance system further comprises a user interface on a computer in communication with the video cameras, logic unit, and storage unit, the user interface including the ability to define user parameters and adjust the plurality of adjustable surveillance parameters.

In one embodiment, the time is set to a fixed value depending on the plurality of adjustable surveillance parameters for the video clip. Alternatively, the time is dynamically adjusted based on the priority of the video clip relative to the priorities of a plurality of video clips. The video clip is deleted or archived when the time expires. The surveillance system further comprises an archive unit for storing the archived video clip. The archive may reside on a remote server in communication with the logic unit and storage units.

In another exemplary embodiment, the present invention is a method for managing memory in a surveillance system, the method comprising assigning a priority to a video clip recorded by a video camera, and storing the video clip for a time proportional to the priority of the video clip. The video camera and any logic units or storage units are in communication via a wired or wireless packet-based network. The method further comprises providing a plurality of adjustable surveillance parameters for the video clip, wherein adjusting of one of said plurality of adjustable surveillance parameters further modifies the priority of the video clip.

The plurality of adjustable surveillance parameters comprises any combination of source parameters, media parameters, user parameters, and correlation parameters. The source parameters adjust priority of the video clip based on characteristics of the video camera that recorded the video clip, media parameters adjust priority of the video clip based on the content of the video clip, and user parameters adjust priority of the video clip based on user-defined rules. The method further comprises providing a user interface on a computer in communication with the video camera and any logic units and storage units, the user interface including the ability to define the user parameters and to adjust the plurality of adjustable parameters.

Additional steps include setting the time to a fixed value depending on the plurality of adjustable surveillance parameters for the video clip, as well as dynamically adjusting the time based on the priority of the video clip relative to the priorities of a plurality of video clips. The video clip is deleted when the time expires. In another embodiment, the video clip is archived when the time expires, said archiving step farther comprising storing the video clip on a remote server.

DETAILED DESCRIPTION OF THE INVENTION

Figure 1:
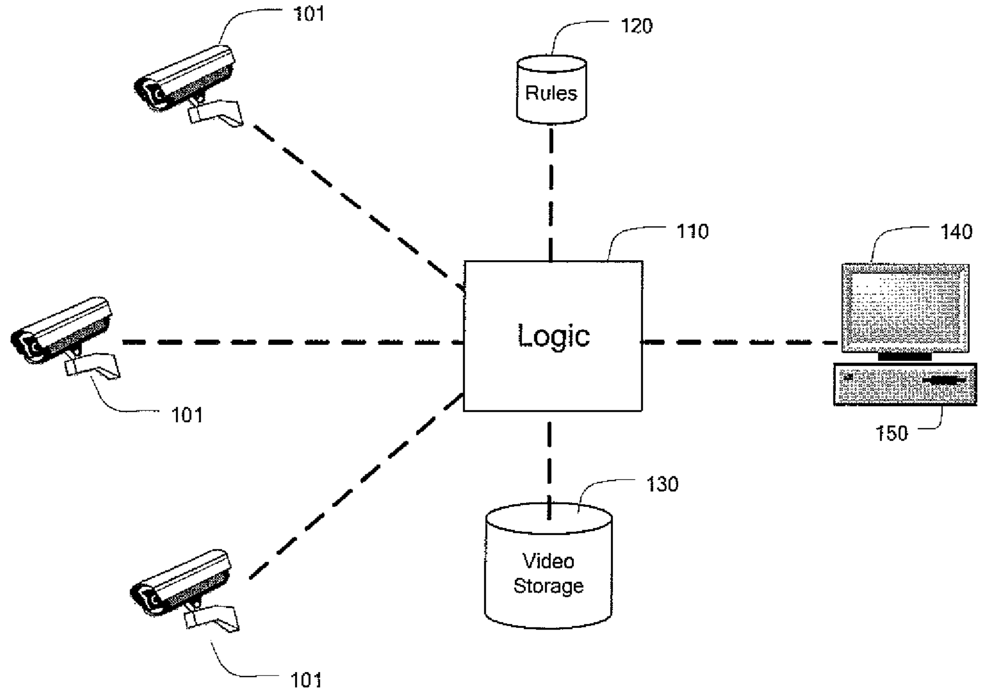
FIG. 1 shows a security system having a rule-based storage clearance mechanism, according to an exemplary embodiment of the present invention.

FIG. 1 shows a rule-based storage clearance system. The system comprises video sources 101, a logic unit 110, a rule database 120, a storage device 130, and a user interface 140. User interface 140 may be a software application stored on computer readable medium such as device 150. Sources 101 may be video cameras for recording a video clip. In one embodiment, sources 101 comprise closed-circuit television (CCTV) cameras. The CCTV cameras may be digital devices that may or may not have their own storage units. A digital CCTV camera may be coupled to a computer (not shown) so as to temporarily store the recorded footage before transmitting to the storage server. The computer would be network-capable to transfer video footage to a storage server. Alternatively, the CCTV camera may be an IP camera having its own network capability.

Cameras 101 monitor a secure area, the secure area being defined by the range of the video camera. The secure area may be any physical area to be monitored, such as a room, enclosure, building, or complex of buildings. Consequently, cameras 101 may be distributed in multiple secure areas. Cameras 101 continuously or periodically monitor a secure area, and generate video footage. The video footage may further be divided into video clips, the video clips being tagged with information such as time and date or recording, location, source camera, and so on.

The video footage and/or video clips are transmitted to a logic unit 110 that resides within a storage system or server. The storage system or server may be within the vicinity of cameras 101, for instance, in or around the secure area. Alternatively, the storage system or server may be part of a central monitoring station, and therefore in a remote location. In either case, if cameras 101 and the storage server are network-capable devices, they may communicate over a local, wide, cellular, or any equivalent network. The video footage may be streamed directly to the storage system, which identifies video clips from the video footage based on the tag or meta-data information such as time/date, etc. Alternatively, the video clips themselves may be tagged and separated before being transferred to the storage server.

Logic unit 110 within the storage server serves the purpose of assigning a priority to the video clip based on a plurality of adjustable surveillance parameters. The surveillance parameters include source parameters, media parameters, user parameters, and other parameters, and are individually assigned a weight. The source parameters adjust priority of the video clip based on characteristics of the video camera that recorded the video clip, media parameters adjust priority of the video clip based on the content of the video clip, and user parameters adjust priority of the video clip based on user-defined rules. If the video clip satisfies a certain combination of parameters, then the priority of the video clip is defined based on the combined weight of the parameters that apply. The parameters are described in more detail in FIG. 2.

The logic unit 110 further comprises a deletion/archival algorithm, stored on a computer readable medium. This algorithm periodically reviews the priority of each video clip, and erases a low priority video clip that has been stored for a certain time, or that has exceeded its allocation of storage space. The time and space are determined by the priority of the video clip, and may be static values, or dynamically adjusting values. For instance, a video clip having a relatively lower priority may simply have a lower storage time relative to a higher priority video clip. Thus, higher priority video clips are stored for longer than lower priority video clips. In another embodiment, the deletion/archival algorithm allocates a percentage of storage space for each video clip based on the priority of the video clip, and uses factors such as the age, quality, and other user-adjustable parameters to determine when to delete the video clip. In one embodiment, the time and/or space are dynamically adjusted for a video clip based on the priority of the video clip relative to the priorities of a plurality of subsequent or pre-existing video clips on the storage unit. For instance, the time may be set to a fixed value depending on the plurality of adjustable surveillance parameters for the video clip. Alternatively, the time is dynamically adjusted based on the priority of the video clip relative to the priorities of a plurality of video clips. The video clip is deleted or archived when the time expires. The surveillance system further comprises an archive unit for storing the archived video clip. The archive may reside on a remote server in communication with the logic unit and storage units.

The system further includes rule database 120 that contains a record for each video clip, as well as parameters assigned to the video clip. The user-adjustable parameters are recorded in the rule database, as are the user-defined rules and conditions described below. Further, storage unit 130 is used to store the video clips. In addition, there may be a remote archive storage unit for archiving old video clips.

The surveillance system further comprises a user interface 140 stored on a computer readable medium, and accessible via a computer 150 in communication with the video cameras, logic unit, and storage unit. A user is provided with a plurality of adjustable parameters that determine how the storage is to be managed. Via the user interface, the weight for each of these parameters can be adjusted and take effect in real-time. The user interface may be physically coupled to and proximate to the logic unit 110 and databases 120, 130, or may be accessed from a remote location, such as a control panel or a central monitoring station.

Figure 2:
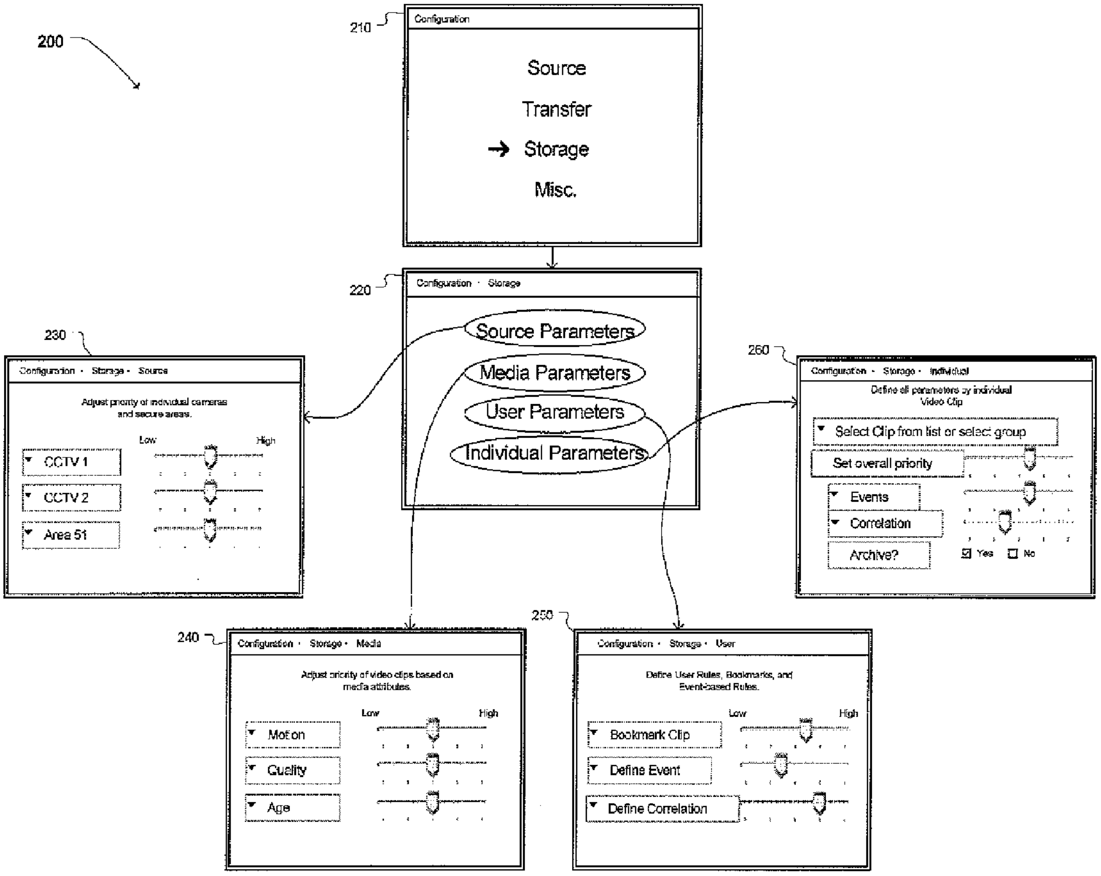
FIG. 2 shows a user interface to adjust surveillance parameters, according to an exemplary embodiment of the present invention.

FIG. 2 shows an exemplary user interface for adjusting surveillance parameters, according to an embodiment of the present invention. A user interface 200 provides a plurality of configuration options 210 such as "source, transfer, storage, and miscellaneous." A user selects "storage management" and is presented with sub-options 220. These allow the user to tweak the effect of various static and dynamic parameters on the recycling/archiving process and are grouped into categories. For instance, the user may be presented with the following options 220 for storage management: "Source parameters, media clip or media parameters, user parameters, individual parameters" and so on. In "source parameters" 230, the user can set up dynamic storage management by adjusting the weights of the various parameters related to the source of the video clip, such as the location of the camera(s) and/or the control panel controlling the camera(s). For instance, the user may specify a priority weight for a particular source camera. This could further lead into allocating storage space or time period per source based on the priority of the source. In a museum, a camera monitoring a valuable piece in an exhibit room would have a higher weight than the camera monitoring the restrooms.

Similarly, in "media parameters," the user can adjust storage management rules based on factors related to the actual content of the footage. A motion-sensing camera may be given higher weight or may be allowed to remain on the storage unit for a longer time than a normal camera. Alternatively, two motion-sensing cameras are given the same weight until one of them actually senses a motion, in which case the other camera takes a lower priority weight and that footage may be deleted earlier. Video clips of a higher quality or resolution may be allocated more or less space, depending on the user's preference. Erasing high-quality video clips and retaining low-quality video clips would maximize the storage space available for many clips. The age of the video clip is another factor that could be taken into account. If the priority of the video clip affects not the time period for storage, but a space allocation, then older clips could be allocated smaller amounts of space, until they are deleted to make room for new younger clips. Other media-related parameters will be evident to one of ordinary skill in the art.

In "user parameters," the user can define storage management rules based on attributes or "bookmarks" that a user has placed on the footage. These may include priority bookmarks, instructions, etc. that may not be related to source or media attributes but are still effective when it comes to determining whether or not to delete/archive the footage. For instance, footage may be tagged at the source as being low-priority on a day off or when the museum is closed. Footage may be tagged for late deletion or being exempt from archiving if a user has reason to believe the footage may be useful at a later date. Similarly, the user can define events associated with one or more video clips. For instance, the user could set up a rule to monitor the "status" of the video clip, or how often the video clip has been accessed or edited. A video clip that is regularly accessed may be part of an investigation, and is thus afforded higher priority. Correlation can be defined in a similar way: if two or more clips undergo similar operations such as being tagged or bookmarked for archival or extended storage, similarly correlated video clips can be allocated the same priority. This option allows the user to define how a clip is related to other clips, other sources, or external events, and thus adjust storage management based on these relations. For instance, the low-priority holiday "bookmark" above can be automated by correlating a source with a calendar of events at that source. The museum cameras all go into low-priority mode on pre-designated holidays at that museum. Similarly, multiple cameras that would otherwise be unrelated can be correlated based on an event or feature that the cameras have in common. A plurality of cameras along a city street can be switched into high-priority mode (thus remaining stored for a longer time, or being allocated more storage space) during an event such as a parade. This would dynamically group together video clips having similar attributes, and assign them the same priority.

Individual parameters 260 provide a means to adjust all the parameters for an individual video clip or user-defined group of video clips. Once a clip is selected, the user is presented with options to adjust the overall priority of the clip, and to define and adjust priority for events and correlation parameters linked to the video clip. Further, the user can select whether or not to archive the clip instead of or prior to deletion.

Figure 3:
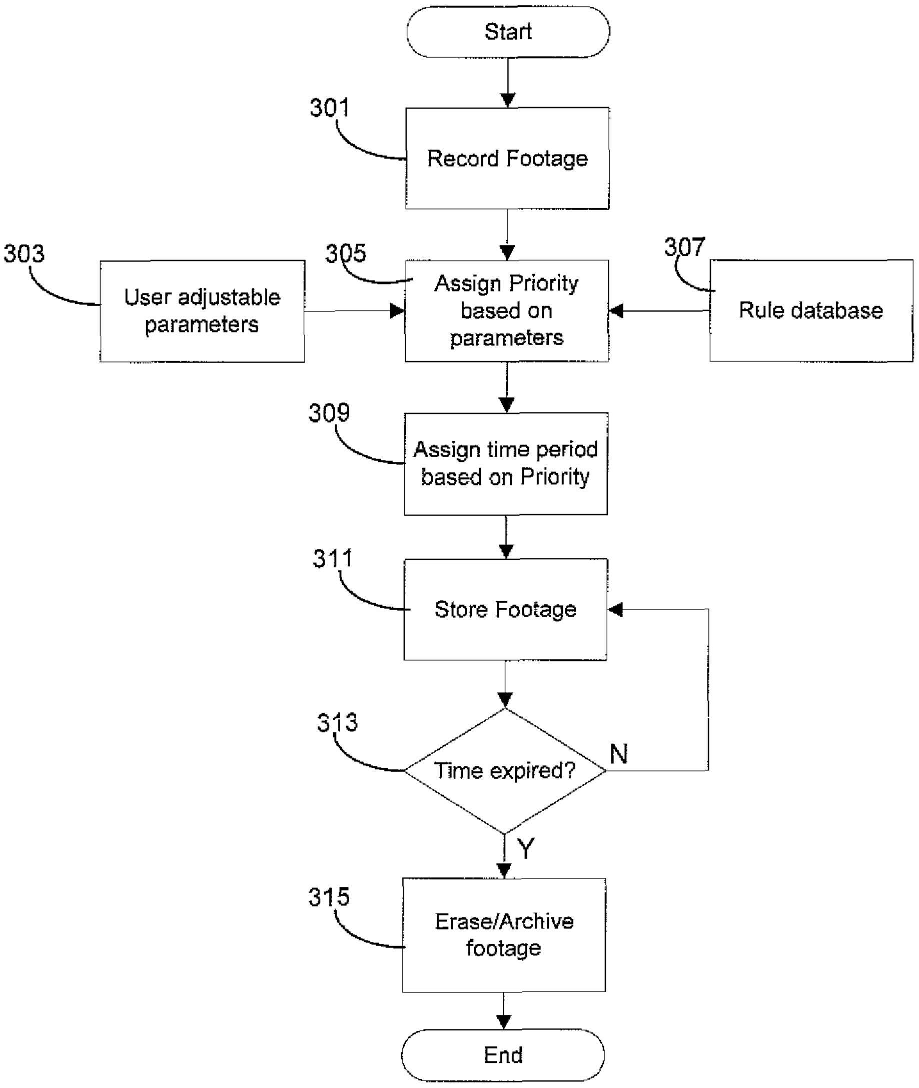
FIG. 3 shows a rule-based storage clearance method, according to an exemplary embodiment of the present invention.

In another exemplary embodiment, the present invention is a method for managing memory in a surveillance system, the method comprising assigning a priority to a video clip recorded by a video camera, and storing the video clip for a time proportional to the priority of the video clip. FIG. 3 shows the method, according to this exemplary embodiment. A source, such as the CCTV camera in FIG. 1, records video footage of a secure area (step 301). As described herein, the video footage may further comprise video clips based on time of day or the type of secure area covered. The method further comprises providing a plurality of adjustable surveillance parameters for the video clip (step 303), wherein adjusting of one of said plurality of adjustable surveillance parameters further modifies the priority of the video clip (step 305). The plurality of adjustable surveillance parameters comprises any combination of source parameters, media parameters, user parameters, and event/correlation parameters, all of which are stored in a rule database (step 307). The source parameters adjust priority of the video clip based on characteristics of the video camera that recorded the video clip, media parameters adjust priority of the video clip based on the content of the video clip, and user parameters adjust priority of the video clip based on user-defined rules. A user interface on a computer in communication with the video camera and any logic units and storage units includes the ability to define the user parameters in step 303 and to adjust the plurality of adjustable parameters.

Based on the priority of the video clip, a lifetime or time period is assigned to the video clip (step 309). The time may be a fixed value depending on the plurality of adjustable surveillance parameters for the video clip, or may be dynamically adjusted based on the priority of the video clip relative to the priorities of a plurality of video clips. The video clip is stored (step 311), and the time period is taken into account by the logic unit during scheduled maintenance. For instance, the logic unit periodically undergoes a recycling mechanism (step 313), whereby any video clip that has exceeded its lifetime, or the time period, is erased or archived (step 315), depending on the rules in the rule database. If the time period has not expired, the video clip remains on the storage unit (reverting back to step 311). The video clip is deleted or archived when the time expires.

Thus, the present invention provides a user with the ability to configure storage rules dynamically, on the fly, and to influence the recycling logic and archiving logic of the storage system at any time. This provides flexibility and control to the configuration process, helping users to manage the storage space dynamically, and preventing waste of space.

While preferred embodiments of the present invention have been described using specific terms, such description is for illustrative purposes only, and it is to be understood that changes and variations may be made without departing from the spirit or scope of the following claims.

The invention claimed is:

1. A surveillance system with dynamic memory management, comprising:

a video camera for recording a video clip;

a storage unit;

a plurality of video clips previously stored in the storage unit;

a logic unit that assigns a respective priority to the video clip and to each of the previously stored video clips based on each of a plurality of adjustable surveillance parameters provided by a user, the logic unit stores the video clip from the video camera as a currently stored video clip in the storage unit based on said priority, and dynamically adjusts a priority of each of the plurality of video clips in the storage unit and deletes or archives at least some of the stored plurality of video clips to take effect in real time based upon changes to the plurality of adjustable surveillance parameters made by the user;

wherein the plurality of adjustable surveillance parameter further comprises any combination of source parameters, media parameters, user parameters, and correlation parameters;

wherein source parameters adjust priority of the video clip based on characteristics of the video camera that recorded the video clip, media parameters adjust priority of the video clip based on the content of the video clip, and user parameters adjust priority of the video clip based on user-defined rules; and wherein deletion or archiving of the video clip is based on the combined weight of the correlation parameters.

2. The surveillance system of claim 1, wherein the logic unit allocates a storage space for the video clip on a storage unit, the storage space being a function of the priority of the video clip.

3. The surveillance system of claim 1, wherein the logic unit allocates a time to store the video clip on a storage unit, the time being a function of the priority of the video clip.

4. The surveillance system of claim 3, wherein the video clip is deleted or archived when the time expires.

5. The surveillance system of claim 4, further comprising: a user interface on a computer in communication with the video cameras, logic unit, and storage unit, the user interface including the ability to define user parameters and adjust the plurality of adjustable surveillance parameters.

6. The surveillance system of claim 1, wherein the video cameras, logic unit, and storage unit are all in communication over a wired or wireless packet-based network.

7. The surveillance system of claim 1, wherein the video clip is deleted or archived when its priority becomes low relative to the priorities of a plurality of video clips.

8. The surveillance system of claim 7, further comprising: an archive unit for storing the archived video clip.

9. A method for managing memory in a surveillance system, the method comprising:

a logic unit assigning a respective priority to each of a plurality of video clips recorded over a time period by one or more video cameras, the respective priority being based on a respective plurality of adjustable parameters;

a storage unit storing each of the video clips based on the respective priority of the video clip; and the logic unit dynamically adjusting a priority of each of the plurality of video clip in the storage unit and deleting or archiving at least some of the plurality of stored video clips to take effect in real time based upon changes to the respective plurality of adjustable surveillance parameters made by a user;

wherein the plurality of adjustable surveillance parameters further comprises any combination of source parameters, media parameters, user parameters, and correlation parameters;

wherein source parameters adjust priority of the video clip based on characteristics of the video camera that recorded the video clip, media parameters adjust priority of the video clip based on the content of the video clip, and user parameters adjust priority of the video clip based on user-defined rules; and wherein deletion or archiving of the video clip is based on the combined weight of the correlation parameters.

10. The method of claim 9, further comprising allocating a respective storage space for the video clip on a storage unit, the storage space being a function of the priority of the video clip.

11. The method of claim 10, further comprising: deleting or archiving each of the video clips when the priority of the video clip is low relative to the priorities of an additional plurality of video clips.

12. The method of claim 11, further comprising archiving each of the video clip on an archive unit.

13. The method of claim 9, further comprising allocating a respective time to store the video clip on a storage unit, the time being a function of the respective priority of the video clip.

14. The method of claim 13, further comprising deleting or archiving the respective video clip when the respective time expires.

15. The method of claim 9, wherein the video camera and any logic units or storage units are in communication via a wired or wireless packet-based network.

16. The method of claim 9, further comprising: providing a user interface on a computer in communication with the video camera and any logic units and storage units, the user interface including the ability to define the user parameters and to adjust the plurality of adjustable parameters.

* * * * *